US008943178B2

(12) United States Patent
Bortnikov et al.

(10) Patent No.: US 8,943,178 B2
(45) Date of Patent: Jan. 27, 2015

(54) CONTINUOUS OPERATION DURING RECONFIGURATION PERIODS

(75) Inventors: Vita Bortnikov, Haifa (IL); Gregory Chockler, Haifa (IL); Dmitri Perelman, Haifa (IL); Shlomit Shachor, Yokneam Eilit (IL); Ilya Shnayderman, Jerusalem (IL); Alexey Roytman, Givat Elah (IL)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 13/597,273

(22) Filed: Aug. 29, 2012

(65) Prior Publication Data
US 2014/0074996 A1 Mar. 13, 2014

(51) Int. Cl.
*G06F 15/177* (2006.01)
*H04L 12/24* (2006.01)

(52) U.S. Cl.
CPC .......... *H04L 41/082* (2013.01); *H04L 41/0816* (2013.01); *H04L 41/0846* (2013.01); *H04L 41/0873* (2013.01); *H04L 41/0893* (2013.01)
USPC ............................ 709/221; 709/220; 709/223

(58) Field of Classification Search
USPC .......... 709/223, 221, 220; 711/202; 370/255; 718/100; 717/168; 375/260; 702/186; 714/16
See application file for complete search history.

(56) References Cited

U.S. PATENT DOCUMENTS

| 7,505,991 | B2 | 3/2009 | Fifield et al. | |
|---|---|---|---|---|
| 2004/0172220 | A1* | 9/2004 | Prekeges et al. | 702/186 |
| 2006/0059253 | A1* | 3/2006 | Goodman et al. | 709/223 |
| 2007/0179975 | A1 | 8/2007 | Teh et al. | |
| 2008/0091709 | A1 | 4/2008 | Chang et al. | |
| 2008/0298276 | A1* | 12/2008 | Chen et al. | 370/255 |
| 2009/0100360 | A1 | 4/2009 | Janzen et al. | |
| 2009/0175367 | A1* | 7/2009 | Kishigami et al. | 375/260 |
| 2009/0313626 | A1* | 12/2009 | Dawson et al. | 718/100 |
| 2011/0296391 | A1* | 12/2011 | Gass et al. | 717/168 |
| 2012/0204000 | A1* | 8/2012 | Biran et al. | 711/202 |
| 2012/0226938 | A1* | 9/2012 | Sakaguchi et al. | 714/16 |

FOREIGN PATENT DOCUMENTS

WO 2008042562 4/2008

OTHER PUBLICATIONS

Tom'as Kliegr et al., "Semantic Analytical Reports: A Framework for Post-Processing Data Mining Result", URL: http://nb.vse.cz/~svatek/ismis09draft.pdf.
Celina M. Olszak and Ewa Ziemba, "Business Intelligence Systems in the Holistic Infrastructure Development Supporting Decision-Making in Organisations", URL:http://ijikm.org/Volume1/IJIKMv1p047-058Olszak19.pdf, 2006.

* cited by examiner

*Primary Examiner* — Le H Luu
(74) *Attorney, Agent, or Firm* — Roy Melzer

(57) ABSTRACT

A method for continuously updating a set of replicas. The method comprises storing a plurality of replicas of data in a current configuration of members from a plurality of nodes, receiving a reconfiguration command by a member of said current configuration, selecting at least one estimated configuration from said plurality of nodes, receiving at least one write command by a member of said current configuration, disseminating said at least one write command to each member of said at least one estimated configuration and validating said at least one estimated configuration. At least one estimated configuration processes at least one of the write commands before the validating is completed.

16 Claims, 5 Drawing Sheets

CONTINUOUS OPERATION DURING RECONFIGURATION PERIODS

BACKGROUND

The present invention, in some embodiments thereof, relates to distributed storage management and, more specifically, but not exclusively, to continuous replica management according to estimated configuration(s).

Several approaches to alleviating reconfiguration bottlenecks in reconfigurable state machines have been proposed. The original idea is described in Lamport [L. Lamport, The part-time parliament. ACM Trans. Comput. Syst., 16(2):133-169, 1998, L. Lamport, Paxos made simple, ACM SIGACT News, 32(4):18-25, December 2001, L. Lamport, D. Malkhi, and L. Zhou. Reconfiguring a state machine. Technical report, Microsoft Research, 2008]. An exemplary implementation thereof is described in SMART, J. R. Lorch, A. Adya, W. J. Bolosky, R. Chaiken, J. R. Douceur, and J. Howell. The SMART way to migrate replicated stateful services. In Proc. EuroSys06, 2006. Basically, the idea is to delay the effect of the configuration agreed in a specific consensus instance by a fixed number alpha of successive consensus instances. If the configuration must take effect immediately, the remaining instances can be skipped by passing a special "window closure" decree consisting of alpha consecutive noop instances. Although this approach allows up to alpha consecutive commands to be executed concurrently, choosing the right value of alpha is nontrivial. On one hand, choosing a too small alpha may under-utilize the available resources. On the other hand, large values of alpha may not match the actual service reconfiguration rate resulting in too frequent invocations of the window closure decrees (which must complete synchronously).

Chubby [M. Burrows. The chubby lock service for loosely-coupled distributed systems. In Proceedings of the 7th symposium on Operating systems design and implementation, OSDI '06, pages 335-350, Berkeley, Calif., USA, 2006. USENIX Association.] and ZooKeeper [P. Hunt, M. Konar, F. P. Junqueira, and B. Reed. Zookeeper: wait-free coordination for internet-scale systems. In Proceedings of the 2010 USENIX conference on USENIX annual technical conference, USENIXATC'10, pages 11-11, Berkeley, Calif., USA, 2010. USENIX Association] expose high-level synchronization primitives (respectively, locks and watches) that can be used to implement a reconfigurable state machine within the client groups.

SUMMARY

According to an aspect of some embodiments of the present invention there is provided a method for updating a plurality of replicas, comprising: storing a plurality of replicas of data in a current configuration of members from a plurality of nodes; receiving a reconfiguration command by a member of the current configuration; selecting at least one estimated configuration from the plurality of nodes; receiving at least one write command by a member of the current configuration; disseminating the at least one write command to each member of the at least one estimated configuration; and validating the at least one estimated configuration; wherein the at least one estimated configuration processes the at least one write command before the validating is completed.

Optionally, the plurality of nodes is nodes of a network cloud. Optionally, the plurality of nodes is nodes of an elastic cluster. Optionally, the validating operation is performed according to a Paxos agreement. Optionally, the at least one estimated configuration comprises a plurality of estimated configurations and at least one estimated configuration processes the at least one write command before the validating is completed. Optionally, at least one invalid estimated configuration from the plurality of estimated configurations is deleted after the validating. Optionally, the plurality of estimated configurations is logged by a branching command log managed in each the replica.

According to an aspect of some embodiments of the present invention there is provided a method for managing a plurality of estimated replica set configurations, comprising: managing a branched command log; adding a branch to the branched command log when a replica receives a new estimated configuration; executing a plurality of independent sequences of a state machine consensus protocol agreements by performing each write command in the command log branch; wherein at least one of a plurality of the write command is executed in an estimated configurations prior to validation of the estimated configuration.

Optionally, the command log branch is identified by a slot number, a ballot number used to propose the reconfiguration command, and an identifier of a replica member proposed with the reconfiguration command. Optionally, the state machine consensus protocol is Paxos. Optionally, invalid estimated configurations for the reconfiguration command become obsolete upon the validation. Optionally, a command log branch of an invalid configuration is deleted upon validation of an estimated configuration of a command log branch branching from a common tree node as the invalid command log branch.

According to an aspect of some embodiments of the present invention there is provided a management system having a plurality of routing modules implementing the method for updating a plurality of replicas, comprising: storing a plurality of replicas of data in a current configuration of members from a plurality of nodes; receiving a reconfiguration command by a member of the current configuration; selecting at least one estimated configuration from the plurality of nodes; receiving at least one write command by a member of the current configuration; disseminating the at least one write command to each member of the at least one estimated configuration; and validating the at least one estimated configuration; wherein the at least one estimated configuration processes the at least one write command before the validating is completed.

According to an aspect of some embodiments of the present invention there is provided a system for continuous operation of a network during reconfiguration periods, comprising: a plurality of routing modules installed in a plurality of nodes which hosts a plurality of replicas of data, each the routing module receives and disseminate a write command; a configuration manager which chooses a leader node from the plurality of network nodes; and a plurality of replication groups having a plurality of the replicas; wherein each the leader node is defined to receive a reconfiguration command from the configuration manager and to propose an estimated configuration, and the node disseminates a write command from a client in at least one the estimated configuration prior to validation of the estimated configuration.

Optionally, said configuration manager is said network node. Optionally, the system further comprises a branching command log hosted in said plurality of replicas; wherein said leader node is further defined to save said plurality of estimated configurations in said branching command log.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
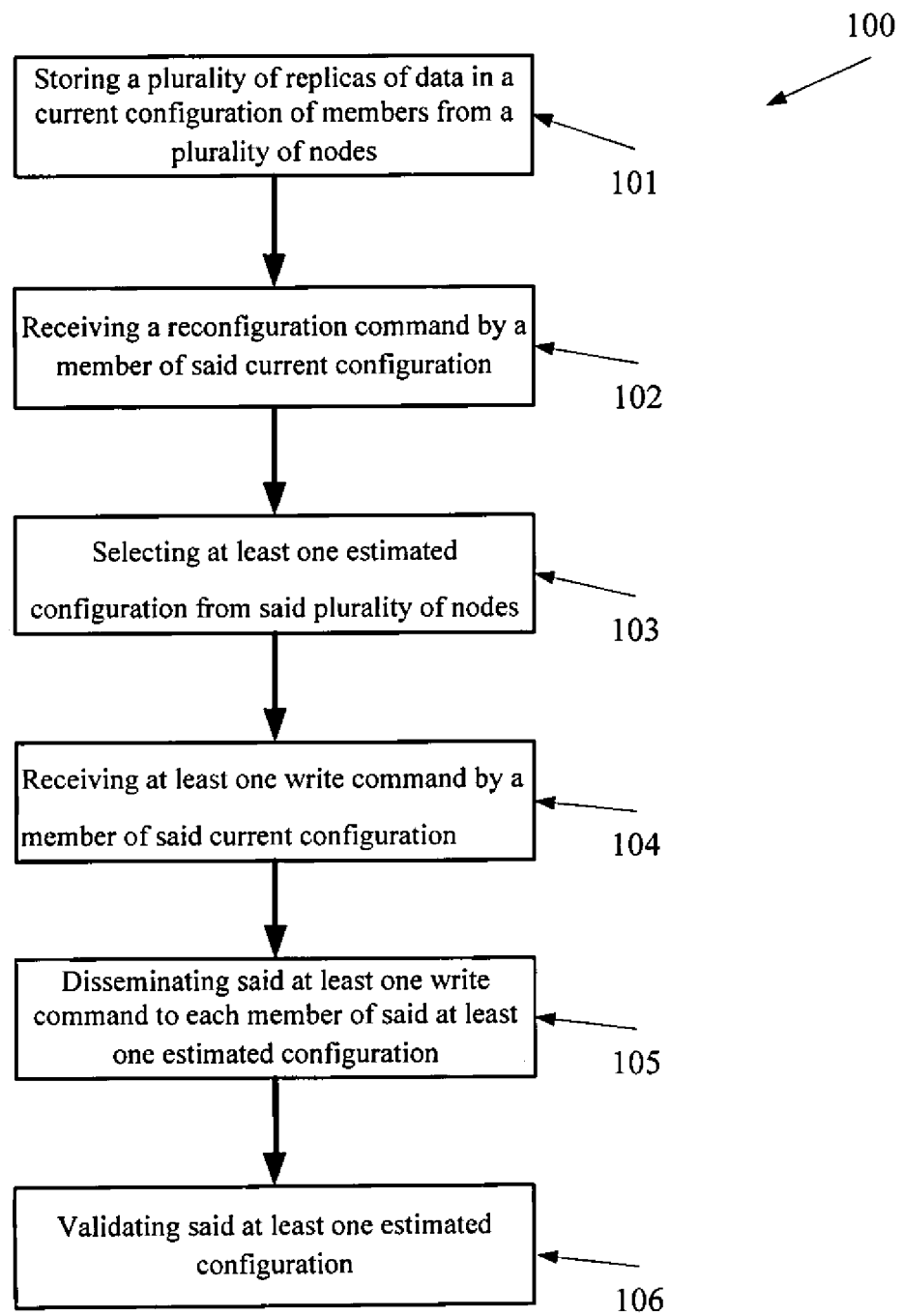
FIG. 1 is a method for continuously updating a set of replicas among a plurality of nodes of a network, according to some embodiments of the present invention.

The present invention, in some embodiments thereof, relates to distributed storage management and, more specifically, but not exclusively, to continuous replica management according to estimated configuration(s).

According to some embodiments of the present invention, there are provided methods and systems for an essentially continuous operation of a network during reconfiguration periods. A plurality of estimated configurations are proposed by a current configuration and used for logging, estimating and/or executing commands prior to validation of the next stable configuration. Command ordering may continue to execute even if an agreement on the configuration relative to which those commands will be ordered is still in progress. Optionally, a command ordering may be executed in an estimated configuration provided the validity of the speculative decisions can be verified once the next agreed configuration becomes available. Optionally, invalid estimated configurations are deleted after validation of the next stable configuration. Validation of the next stable configuration may be performed by the replica and/or a leader node.

Optionally, the replica(s) updates a tree based log for managing configurations. A reconfiguration command triggers branching. Each branch represents an estimated configuration and its associated user commands. A branch is uniquely identified. After an agreement of at least one estimated configuration associated with a particular reconfiguration command is achieved, invalid configurations may be deleted and the valid configuration may be connected to a tree trunk of the tree in tree based log.

Replicated state machine is an important tool for maintaining integrity of distributed applications and services in failure-prone data center and cloud computing environments. In massively multi-tenant settings of today's clouds, large numbers of replica groups share the common hardware infrastructure, and compete for limited resources. In order to be able to dynamically adapt to changing resource availability, load fluctuations, variable power consumption, and support better data locality, the consistent replication layer must be elastic, i.e., being capable of supporting dynamically changing replication groups with a minimum disruption to the service availability and performance. To preserve correctness across configuration changes, the reconfiguration protocol must ensure that the state machine execution responsibilities have been transferred to the members of the new configuration in an orderly fashion, and in particular, no new user commands are executed in the new configuration before it has been agreed by the members of the old one. The resulting throughput degradation might be prohibitive if the rate of dynamic changes is high. Furthermore, the service availability will suffer if the old configuration is lost (e.g., due to a failure) before the agreement on the new one has been completed. For example, Amazon Web Services [http://aws.amazon.com] must guarantee 99:99's availability, which translates to less than 52 minutes of unavailability a year. If a significant portion of the service up-time the normal operation is interrupted to execute the reconfiguration protocol, these availability goals might not be met. According to some embodiments of the present invention, a management system for elastic services is provided. The said management system resolves the inefficiencies, and availability limitations associated with dynamic reconfiguration. The said management system achieves the said goal of improved efficiency by implementing a replicated state machine protocol, which employs speculative executions to ensure an essentially continuous operation during the reconfiguration periods as well as in situations where failures prevent the agreement on the next stable configuration from being reached in a timely fashion. In the common case when the leader remains live and connected for a long time, each write command may be ordered within just two message delays, and multiple command orderings may be executed in parallel which may result in a high throughput and/or low latency protocol.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

All dissemination operations which are referred to in this document performed by the replica(s) may be performed by the node(s) which hosts the replica(s), for example, by a routing module installed in each node. Reference is now made to FIG. 1, which is a method 100 of reconfiguring a set of replicas of data in a management system while write command(s) are continuously received and processed by the management system, according to some embodiments of the present invention. The set of replicas is stored in a plurality of nodes of a network, such as a cloud network or an elastic server. A plurality of routing modules may be installed in a plurality of network nodes. Optionally, a routing module may be installed in a replica. A routing module may receive and disseminate a write command and/or a reconfiguration command. For brevity, a plurality of nodes may be referred to herein as a node. First, as shown at 101, a plurality of replicas of data is stored in a configuration of members from a plurality of nodes, for brevity referred to herein as a current configuration of replicas. The current configuration includes a set of selected nodes, each having an active and/or idle state. The current configuration is in agreement by a state machine consensus protocol according to which the management system is operated. Now, as shown at 102, a reconfiguration command is received, optionally by a member of the current configuration. As used herein, the term reconfiguration command means a command for changing a current configuration into a new configuration. Now, as shown at 103, one or more estimated configurations are selected from the plurality of nodes. The estimated configuration(s) are optionally configuration(s) which have not been assessed by a state machine consensus protocol to be either valid or invalid. The selection is optionally performed by a leader replica or by a management entity which manages the leader replica, for example a messages dissemination module installed in a hosting node and/or another node. Now, before a new set of replicas of the data is validated on the estimated configuration(s), as shown at 104, a member of the current configuration may receive one or more write command(s). Now, as shown at 105, one or more write commands are disseminated to each member the new set of replicas stored in the estimated configuration. Now, as shown at 106, the estimated configuration(s) are validated. The validating may be performed by a Paxos agreement, Virtual Synchrony, BFT, Zab, HQ and/or other state machine protocols. As used herein, the term Paxos means a family of state machine consensus protocols for achieving overall system reliability in the presence of a number of faulty processes using a consensus system. An example of one such state machine consensus protocol may be a family of protocols, as proposed by the inventor of the Paxos protocol: Leslie Lamport [L. Lamport. Paxos made simple. ACM SIGACT News, 32(4):18-25, December 2001] and variations upon it, comprising reconfigurable Paxos, vertical Paxos and/or horizontal Paxos. As used herein, the term reconfigurable Paxos means a state machine protocol in which replica configurations are treated as a part of the replicated state, and are being agreed upon in their own consensus instances. The one or more write commands are processed by one or more of the members of the estimated configuration before any of the estimated configuration(s) are validated. Speculatively agreed write commands may be applied to the state either immediately, at the risk of the possible future rollback, and/or may be applied when their branch is validated against the agreed configuration. If invalid estimated configurations exist, they may be deleted or otherwise become obsolete after the validation of an estimated configuration relating to the same reconfiguration command. The method 100 and/or operations of the method 100 may be iterative. A validated estimated configuration may become a current configuration and the method 100 may start over again from operation 101 and/or from operations 102 to 106.

The method 100 may improve elasticity of replicated services. Such replicated services may be hosted in clouds and/or large data centers. This method may provide continuous operation during the reconfiguration periods and/or in situations where failures prevent the agreement on the next stable configuration from being reached in a timely fashion.

Reconfiguration according to the method 100 may have a little impact on the overall command throughput since in a common case, estimated configurations would coincide with those being eventually decided, and the result of the reconfiguration agreement will be available by the time the first speculative command is agreed upon, The method 100 may preserve the system availability even when underlying failures prevent the configuration agreement from completion. The system availability preservation may be achieved by continuous ordering of incoming write commands in an estimated configuration.

Figure 2:
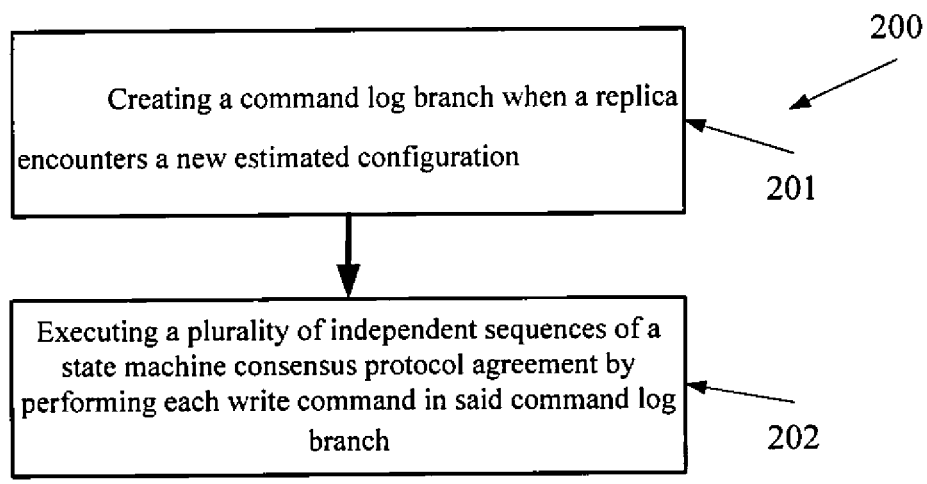
FIG. 2 is a method for managing a plurality of estimated replica set configurations among a plurality of nodes of a cloud network or an elastic server, according to some embodiments of the present invention.

Reference is now made to FIG. 2, which is a method 200 for managing a plurality of estimated replica set configurations among a plurality of nodes of a network, according to some embodiments of the present invention. First, as shown at 201, during the operation of a data management system which manages a plurality of replicas in a plurality of nodes, a reconfiguration message is received and one or more new estimated configurations are selected. Per estimated configuration, a new command log branch is stored in a command log branch. As used herein, the term branching command log means a log of commands having a tree structure, wherein each branch is associated with a configuration and/or an estimated configuration. The command log branch is optionally identified by a unique combination of a slot number, a ballot number used to propose the reconfiguration command, and an identifier of a replica member proposed with the reconfiguration command. The branch identifier may be attached to all messages associated with the state machine protocol agreement instances, for example Paxos agreement instances, proposed within the branch, and may be used to route received messages to the correct instance of the Paxos, as shown in the following exemplary implementation, Algorithm 2, lines 20-22:

---
Algorithm 2 Message Handlers for Replica $p_i$:
---
20: Upon receiving m = ⟨ USER, bid, · ⟩ or ⟨ RECON, bid, · ⟩ :
21:   if (∃B ∈ branches, B.bid = bid) then
22:     Pass m to the Paxos instance for branch B ---
-continued
Algorithm 2 Message Handlers for Replica $p_i$:
---
23: New user command cmd:
24:   For each branch B ∈ branches where $p_i$
      is the proposer for x:
25:     Propose ⟨ USER, B.bid, cmd ⟩ in the instance of Paxos protocol for B
26: New reconfiguration command cmd = ⟨ C ⟩ :
27:   For each branch B ∈ branches where $p_i$
      is the proposer for B:
28:     Let x = ⟨ B.nextSlot, B.bal, $p_i$ ⟩
29:     Send ⟨ JOIN, B.bid, x, C ⟩ to all members of C
30:     Propose ⟨ RECON , B.bid, x, C ⟩ in the instance of Paxos protocol for branch B
31: Upon receiving: ⟨ JOIN, bid, x, C ⟩ :
32:   Add branch X = ⟨ x, bid, C, x.bal, ⟨ ⟩ , x.slotNum + 1 ⟩
      to branches
33:   Start new instance of Paxos protocol for branch X, and initiate state transfer (see Section 4.2)

Figure 4:
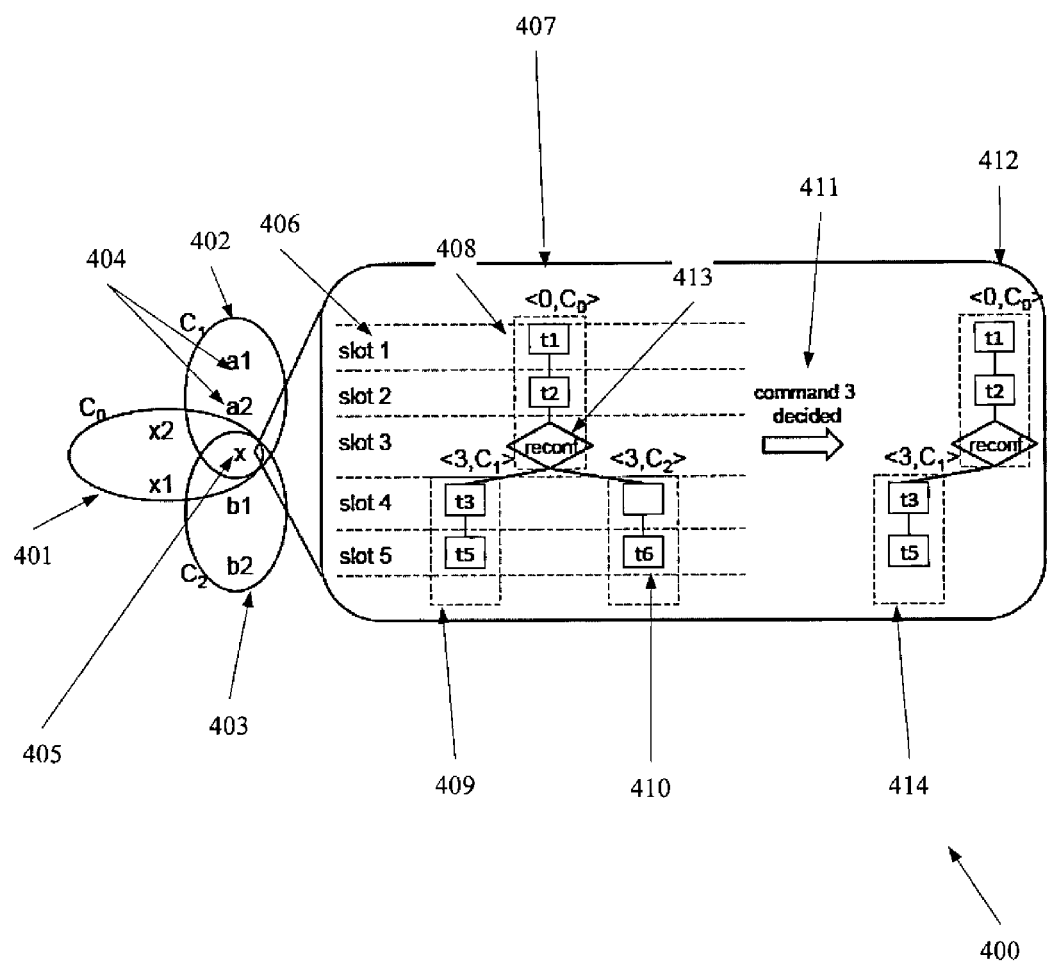
FIG. 4 is a schematic illustration of a branching command log maintaining multiple branches during reconfiguration, according to some embodiments of the present invention.

Now, as shown at 202, replicas execute a plurality of independent sequences of a state machine consensus protocol agreement by performing each write command in the command log branch. Exemplary state machine protocols comprise: Paxos, Virtual Synchrony, BFT, Zab and/or HQ. One or more of the estimated configurations is validated, as shown at 414. Invalid estimated configurations for the reconfiguration command may become obsolete upon validation, as shown at 410. A command log branch of an invalid configuration may be deleted upon validation of an estimated configuration of a command log branch branching from a common tree node as the invalid command log branch. A command log branch of a valid configuration may be merged into command log trunk provided they form a continuous sequence rooted at a slot of trunk as shown in FIG. 4. This is accomplished by the background task shown in the following exemplary implementation of Algorithm 3:

---
Algorithim 3 Total Order Construction at Replica $p_i$:
---
34:   Task Construct Total Order:
35:     curBranch := $B_0$
36:     next := 1
37:     while (true) do:
38:       idx := next − curBranch.bid.slotNumber
39:       Block until idx ≤ length(curBranch.cmdLog)
40:       while (idx ≤ length(curBranch.cmdLog)) do:
41:         cmd := curBranch.cmdLog[idx − 1]
42:         B := {b ∈ branches : b.parent = curBranch ∧ b.slotNumber = next}
43:         if (cmd = ⟨ RECON, ·, x, · ⟩ ∧
            ∃b ∈ B : b.bid = x then
44:           Discard curBranch, terminate Paxos instance associated with curBranch
45:           curBranch := b
46:           B := B \ {b}
47:         Recursively discard all branches in B
48:         Append cmd to trunk
49:         next := next + 1

Figure 3:
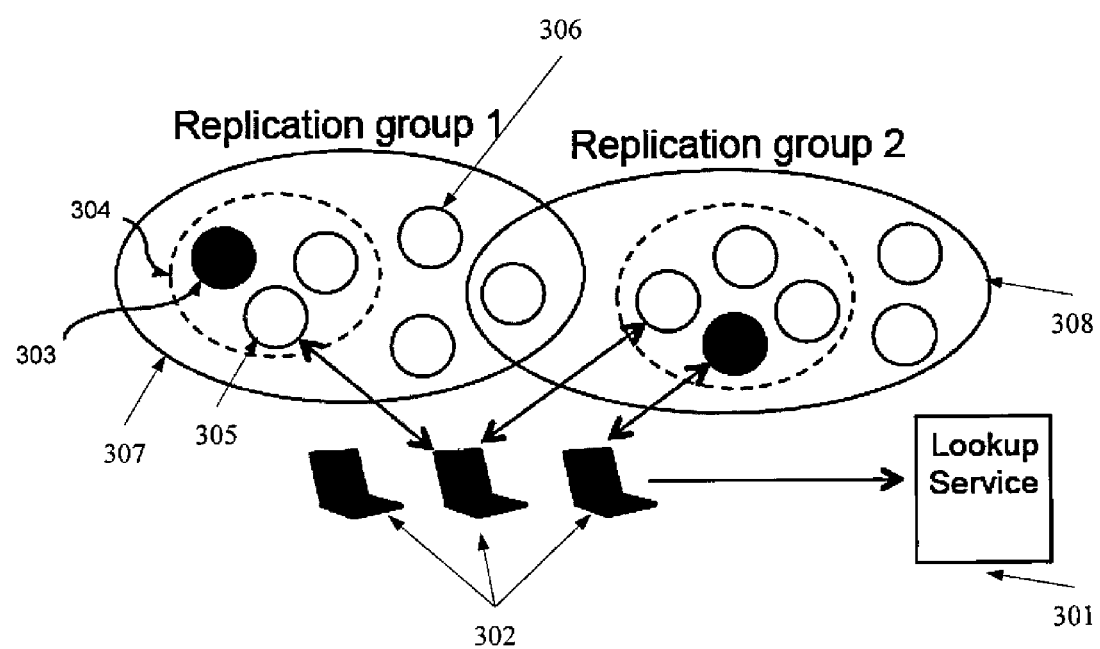
FIG. 3 is a schematic illustration of a replication group structure, according to some embodiments of the present invention.

Reference is now made to FIG. 3, which is a schematic illustration of a replication group structure, according to some embodiments of the present invention.

Clients 302 are assigned to nodes in one to one, one-to-many, many-to-one and/or many-to-many relationship. The nodes are organized into replication groups, for example 307 and 308. Each node of the replication group can be either active 305, 303 or idle 306. Active nodes, such as 305 and/or 303, may hold the up-to-date copies of the service state, and may be responsible for the client and reconfiguration command ordering. The set of all currently active nodes of a replication group form the group's cohort 304. The ordering protocol may be orchestrated by a distinguished node of the cohort, called the leader 303. Although the idle nodes 306 do not participate in the command ordering, they are nevertheless available for serving the state transfer requests. They may be taken off-line once it is verified their copies of the service state have been propagated to a sufficient number of the group nodes. Clients 302 may be connected to a lookup service 301. The current cohort configuration 304 and leader identity 303 within each replication group 307,308 may be maintained by the cohort members, and propagated to the idle members 306 through a gossip-based protocol. This information may be made available to the clients 302, and newly joining replicas through an external lookup service 301. The external lookup service may be DNS and/or LDAP, which maps each group name to its cohort configuration 304 and leader identity 303.

Reference is now made to FIG. 4, which is a schematic illustration of a branching command log maintaining multiple branches during reconfiguration, according to some embodiments of the present invention. Estimated configurations may be logged by a branching command log managed in each said replica. A branching command log allows speculative execution of user commands relative to estimated configurations instead of agreed configurations. For example, a sequence of write commands is executed relative to an estimated configuration C0 401. This sequence of write commands may be represented as a branch in the global command log 407 starting at slot 1 406, which is the position allocated for the agreement on C0. Each branch executes a stream of a state machine consensus protocol, for example Paxos agreement instances, and the agreement streams within different branches 409, 410 proceed independently from each other. In particular, each branch may maintain its own set of a state machine consensus protocol data structure. The data structure may comprise of a subset of a maximum ballot number, the totally ordered command prefix, and/or the next available agreement slot. The data structure may be exposed to the speculative state machine. The following exemplary implementation, Algorithm 1 lines 9-11, presents one such data structure:

---
Algorithm 1 Types and States for Replica $p_i$:

1: Record BranchID:
2:   $\mathbb{N}$ : slotNum     ▷ slot num of the reconfiguration command in the parent branch
3:   Ballot: bal     ▷ initial ballot of the branch
4:   PID: branchInitiator     ▷ identifier of the reconfiguration command proposer
5: Record PaxosBranch:
6:   BranchID: bid     ▷ identifier of this Paxos branch
7:   BranchID: parent     ▷ identifier of the parent branch
8:   PID[ ]: config     ▷ configuration of this Paxos branch
9:   Ballot: bal     ▷ maximum ballot number locally known to this Paxos branch
10:  Command[ ]: cmdLog     ▷ prefix of user and reconfiguration commands ordered by this Paxos branch
11:  $\mathbb{N}$ : nextSlot     ▷ next available command slot locally known to this Paxos branch
12: Replica State Variables:
13:  Set of PaxosBranch: branches     ▷ locally known live Paxos branches
14:  Command[ ]: trunk     ▷ global total order prefix
15: Replica State Initialization:
16:  Let $B_0 = \langle b_0, \bot, C_0, bal_0, \langle \rangle, 1 \rangle$ where $C_0$ is the initial configuration, $b_0 = \langle 0, bal_0, q \rangle$, and q is a deterministically chosen member of $C_0$.
17:  branches = $\{B_0\}$
18:  trunk = $\langle\langle RECON, \bot, b_0, C_0 \rangle\rangle$
19:  Start an instance of Paxos protocol for branch $B_0$

---

Figure 5:
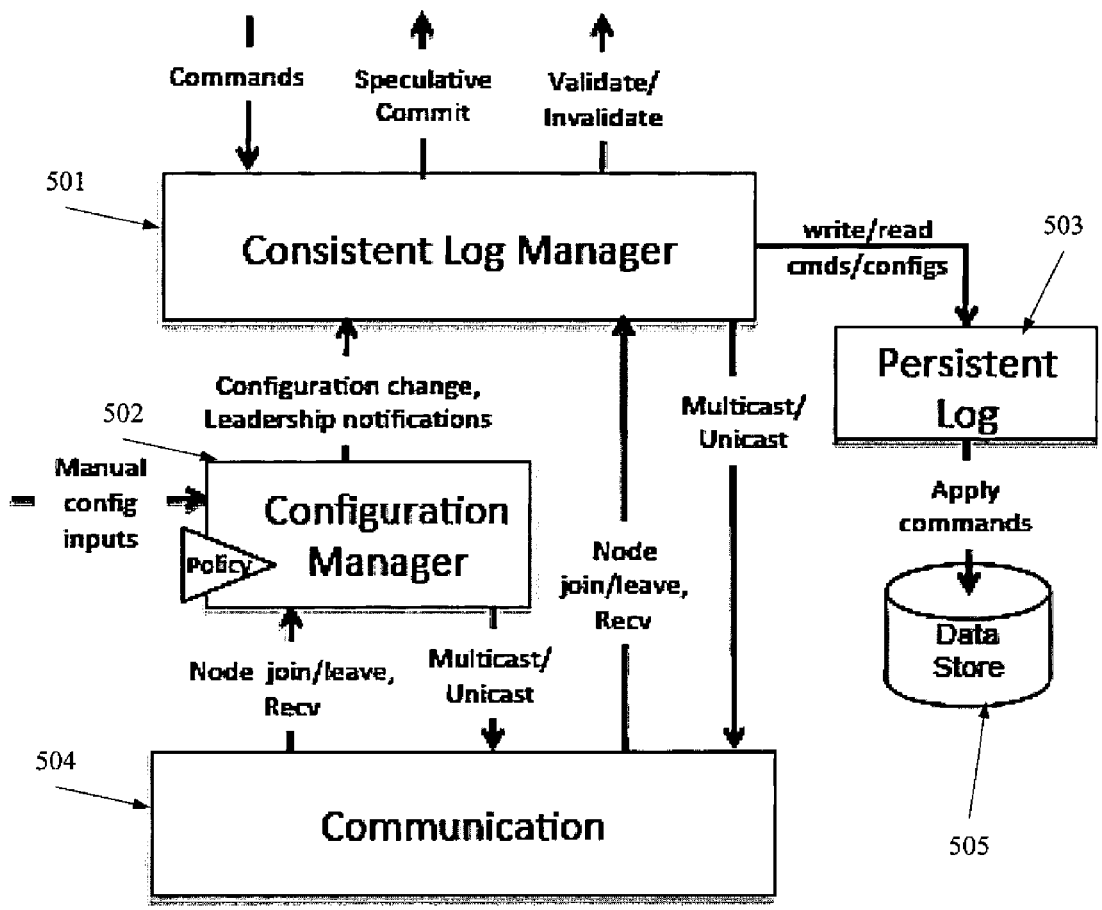
FIG. 5 is a schematic illustration of a layered structure of each individual replica, according to some embodiments of the present invention.

All the live branches known to a replica, such as 409 and 410, are kept in the set branches (Algorithm 1, line 13), and may be linked together into a tree-like structure 407 through a parent branch 408 identifier associated with each branch (Algorithm 1 line 7). A replica may create a new speculative branch and add it to its local branches set (Algorithm 2 line 32) whenever it receives a JOIN message carrying the new and parent branch identifiers, and the new configuration that spawned the branch 413. The replica may then start a new instance of a state machine consensus protocol agreement, such as a Paxos agreement, for that branch initializing it with one of types: valid 414, invalid (410 after command 3 was decided), or speculative 409. The globally ordered command prefix may be represented by the state variable called trunk 408 (exemplified in Algorithm 2 line 14). The valid branches 414 may be merged into trunk 408 provided they form a continuous sequence rooted at a slot of trunk. The branch spawned by a reconfiguration command 413 may uniquely identified by a triple consisting of the following three components (exemplified in Algorithm 1 lines 2-4): (1) slot number occupied by cmd in the parent branch, (2) ballot number that was used to propose cmd, and (3) identifier of the cmd's proposer. The branch identifier may be attached to all messages associated with a state machine consensus protocol agreement instances proposed within the branch. The branch identifier may be used to route received messages to the correct instance of the state machine consensus protocol (exemplified in Algorithm 2 lines 20-22). Invalid estimated configurations may be deleted after said validation 411, for example as represented by branch 410, which does not appear in global command tree 412. Reference is now made to FIG. 5, which is a schematic illustration of a layered structure of each individual replica, according to some embodiments of the present invention. User commands may be processed by the consistent log manager layer 501 whose responsibility is to maintain globally ordered command log with possible speculative branching, for example as depicted in FIG. 4. The command log is persisted on stable storage through the persistent log layer 503. Whenever the size of a locally maintained log grows beyond a configured upper limit, a portion of the globally ordered command prefix may be clipped, and the commands in this prefix are applied to the local copy of the replicated state kept on the persistent data store 505. A configuration manager 502 may keep track of the current cohort configuration, and plans and triggers configuration changes, which may be passed to a consistent log manager 501 for agreement. As used herein, the term configuration manager means a high-level resource management system comprising placement controllers, load balancers, and health-monitoring systems. Reconfiguration may be initiated through configuration manager and/or through administrative inputs. The configuration manager may plan and/or trigger configuration changes based on the current configuration, the current configuration membership, and/or pluggable reconfiguration policies.

New cohort members are recruited from the set of the idle members of the replication group. The configuration change decisions may be driven by the current view of the replication group, cohort membership, and a pluggable policy. A configuration manager 502 may also in charge of selecting the cohort leader. Both a consistent log and configuration managers 501 may utilize services provided by a communication layer 504 for disseminating protocol messages, and failure detection.]

The reader is also referred to [FRAPP'E: Fast Replication Platform for Elastic Services; Vita Bortnikov, Gregory Chockler, Dmitri Perelman, Alexey Roytman, Shlomit Shachor, and Ilya Shnayderman; 1 Aug. 2011. Technion publication: http://tx.technion.ac.il/~dima39/publications/ladis11.pdf]

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant state machine protocols, command logs, network clouds and/or elastic servers will be developed and the scope of the terms state machine protocols, command logs, network clouds and/or elastic servers are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for updating a plurality of replicas, comprising:
storing a plurality of replicas of data in a current configuration of members from a plurality of nodes;
receiving a reconfiguration command by a member of said current configuration;
selecting at least one estimated configuration from said plurality of nodes;
receiving at least one write command by a member of said current configuration;
disseminating said at least one write command to each member of said at least one estimated configuration; and
validating said at least one estimated configuration;

wherein said at least one estimated configuration processes said at least one write command before said validating is completed.

2. The method of claim 1, wherein said plurality of nodes are nodes of a network cloud.

3. The method of claim 1, wherein said plurality of nodes are nodes of an elastic cluster.

4. The method of claim 1, wherein said validating operation is performed according to a Paxos agreement.

5. The method of claim 1, wherein said at least one estimated configuration comprises a plurality of estimated configurations and at least one estimated configuration processes said at least one write command before said validating is completed.

6. The method of claim 5, wherein at least one invalid estimated configuration from said plurality of estimated configurations is deleted after said validating.

7. The method of claim 5, wherein said plurality of estimated configurations are logged by a branching command log managed in each said replica.

8. A management system having a plurality of routing modules implementing the method of claim 1 on nodes.

9. A method for managing a plurality of estimated replica set configurations, comprising:
   managing a branched command log;
   adding a branch to said branched command log when a replica receives a new estimated configuration; and
   executing a plurality of independent sequences of a state machine consensus protocol agreements by performing each write command in said command log branch; wherein at least one of a plurality of said write command is executed in an estimated configurations prior to validation of said estimated configuration.

10. The method of claim 9, wherein said command log branch is identified by a slot number, a ballot number used to propose said reconfiguration command, and an identifier of a replica member proposed with said reconfiguration command.

11. The method of claim 9, wherein said state machine consensus protocol is Paxos.

12. The method of claim 9, wherein invalid estimated configurations for said reconfiguration command become obsolete upon said validation.

13. The method of claim 12, wherein a command log branch of an invalid configuration is deleted upon validation of an estimated configuration of a command log branch branching from a common tree node as said invalid command log branch.

14. A system for continuous operation of a network during reconfiguration periods, comprising:
   a plurality of routing modules installed in a plurality of nodes which hosts a plurality of replicas of data, each said routing module receives and disseminate a write command;
   a configuration manager which chooses a leader node from said plurality of network nodes; and
   a plurality of replication groups having a plurality of said replicas;
   wherein each said leader node is defined to receive a reconfiguration command from said configuration manager and to propose an estimated configuration, and said node disseminates a write command from a client in at least one said estimated configuration prior to validation of said estimated configuration.

15. The system of claim 14, wherein said configuration manager is said network node.

16. The system of claim 14, further comprising a branching command log hosted in said plurality of replicas; wherein said leader node is further defined to save said plurality of estimated configurations in said branching command log.

\* \* \* \* \*